June 29, 1926.
W. E. RUMRILL
HOSE HOLDER
Filed July 20, 1925
1,590,910
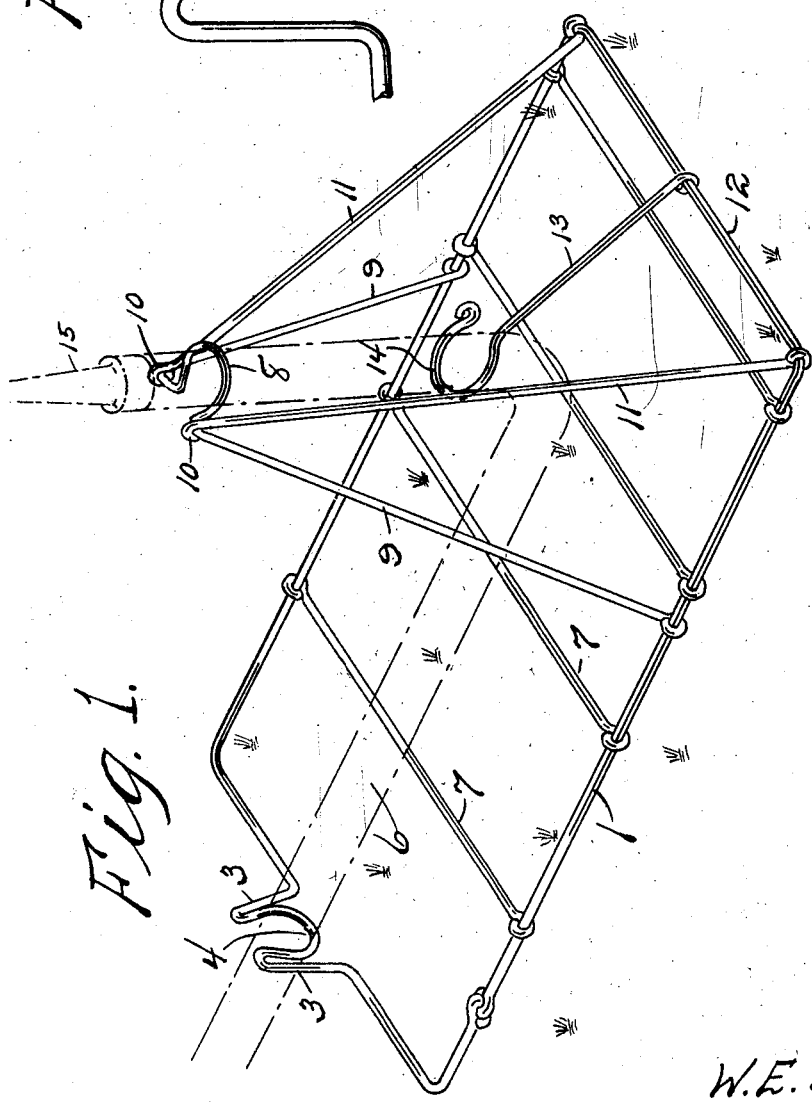

Patented June 29, 1926.

1,590,910

UNITED STATES PATENT OFFICE.

WILLIAM EDWARD RUMRILL, OF SALINA, KANSAS.

HOSE HOLDER.

Application filed July 20, 1925. Serial No. 44,889.

My present invention has reference to a means for supporting a garden hose in a position for watering or spraying a lawn.

An object is the provision of a simply and cheaply constructed device for this purpose by means of which the hose will be firmly supported and the nozzle end thereof arranged in an upright position to provide, in effect a fountain, or wherein the nozzle may be held at various desired angles in thoroughly sprinkling a lawn.

The improvement further resides in certain features of construction, combination and operative association of parts, such as is disclosed by the drawings which accompany and form part of this application.

In the drawing:

Figure 1 is a perspective view of the improvement showing a hose supported thereon.

Figure 2 is a fragmentary elevation looking toward one of the hose supporting jaws.

As disclosed by the drawing, my improvement is preferably constructed of wire and includes a substantially rectangular base 1. One end of the base is approximately centrally extended upwardly and inwardly as at 3, and from thence downwardly and outwardly to a connecting rounded portion 4. The portion 4 and the inclined sides thereof provide a spring jaw in which a hose 6 is effectively clamped. Throughout its length the base 1 has its sides connected by reinforcing wires 7.

The numeral 8 designates a U-shaped jaw similar to the jaw just described. The upper angular ends of the jaw 8 are formed with downwardly extending portions 9. The ends of these portions 9 are formed with eyes that embrace the sides of the base 1.

Arranged around the supporting arms 9 for the jaw 8 at their connection with the said jaw there are the eye ends 10 of the brace rods 11. These rods have their lower ends rounded to provide eyes which are arranged around the outer corners of the frame 1. The hose 6 is also received in the jaw 8, as disclosed by Figure 1 of the drawing.

Slidably but hingedly connected to the upper end 12 of the base 1 is a rod 13. This rod has a hook-shaped end 14, and this hook is designed to be arranged over, and to receive therethrough the hose, 6.

As disclosed by the drawings the hose 6 is received between the jaws 4 and 8, and the hook 13 is brought to engage with the hose at the bend therein. This will cause the water from the hose to be sprayed in a vertical direction. The jaw 8 is arranged at a slight downward inclination from its support, and incident to the resiliency of the jaws 4 and 8, the hose, when in such position need not be engaged by the hook 14. By adjusting the nozzle any desired spray may be obtained. The hook carrying rod 13 is adjustable on the element 12 of the base, so that the hose may be positioned at any desired angles with respect to its support and engaged, when at such angles by the hook 14. With the improvement the spray from the nozzle may be directed to different places on the lawn by taking hold of the hose and pulling it to wherever wanted, without shutting off the water.

The simplicity and advantages of my construction will be perfectly apparent to those skilled in the art to which such inventions relate, so that a further detailed description will not be required.

Having thus described the invention, I claim:

1. A support for lawn hose comprising a substantially rectangular open-frame base, said base having one of its ends formed with an upstanding spring hose engaging jaw, a second and elevated spring hose engaging jaw adjacent to the opposite end of the base, and a hook carrying rod pivotally and slidably mounted on the last mentioned end of the base and a hook on the rod designed for engagement with the hose.

2. A support for lawn hose, comprising a substantially rectangular base formed from a strand of wire having its inner end bent upwardly and rounded inwardly to provide a spring hose engaging jaw, a second spring hose engaging jaw adjacent to the opposite end of the base, angular arms extending therefrom and connected to the sides of the base, brace rods between the second jaw and the outer end of the base, a hook carrying rod pivotally and slidably mounted on the said outer end of the base, and the hook of said rod being designed to engage the hose, and transversely arranged brace members secured to the sides of the base.

In testimony whereof I affix my signature.

WILLIAM EDWARD RUMRILL.